April 20, 1948. G. L. HELLER 2,439,850
MANUFACTURE OF CARBON BLACK
Filed Sept. 8, 1944 2 Sheets-Sheet 1
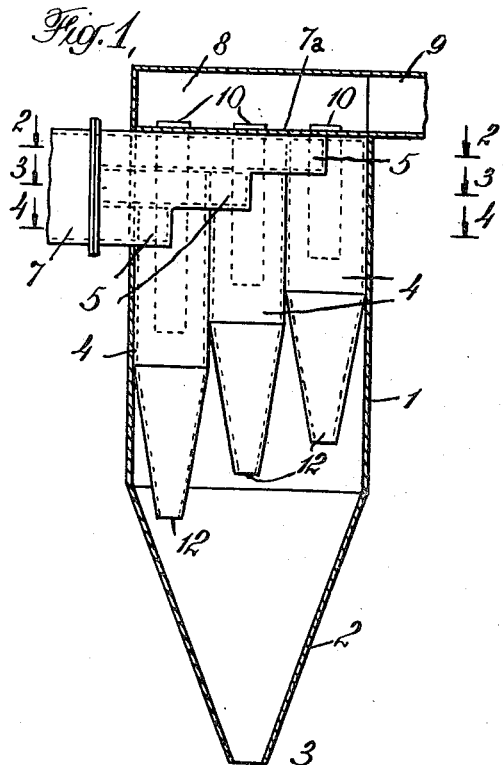
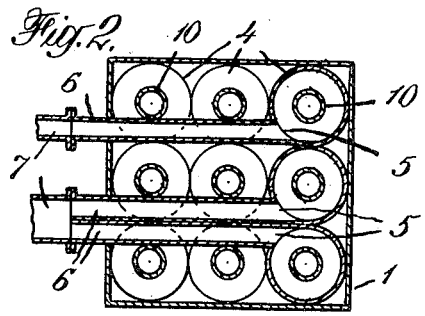
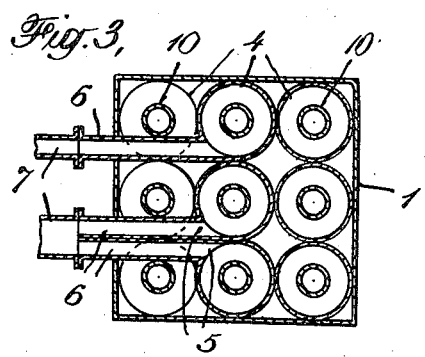
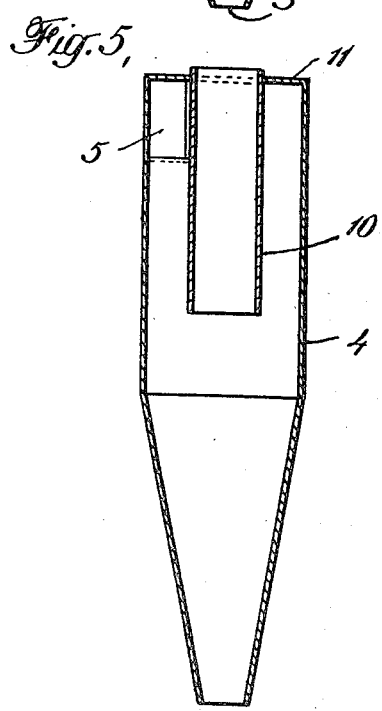
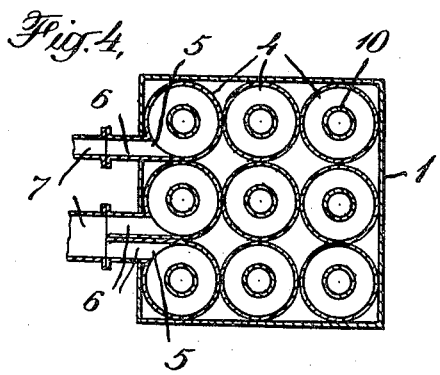
INVENTOR
George L. Heller
BY
Pennie, Edmonds, Morton & Barrows
ATTORNEYS April 20, 1948.  G. L. HELLER  2,439,850
MANUFACTURE OF CARBON BLACK
Filed Sept. 8, 1944   2 Sheets-Sheet 2

INVENTOR
George L. Heller
BY
Pennie, Edmonds, Morton & Barrows
ATTORNEYS

Patented Apr. 20, 1948

2,439,850

UNITED STATES PATENT OFFICE 2,439,850

MANUFACTURE OF CARBON BLACK

George L. Heller, Monroe, La., assignor to Columbian Carbon Company, New York, N. Y., a corporation of Delaware Application September 8, 1944, Serial No. 553,265

1 Claim. (Cl. 183—83)

This invention relates to improvements in the separation of aerosols from gaseous media. It is of particular utility in the separation and recovery of flocculated aerosols, such as flocculated carbon black of the furnace type.

With the advent of the production of colloidal carbons by furnace processes, new methods of separating the colloidal particles of carbon black from their suspension in the furnace gases became necessary. Methods previously employed for the separation of suspended solid particles from gaseous media were found impractical or inefficient for the separation and recovery of these colloidal furnace carbons, which, unlike lamp black, do not tend to form agglomerates but tend to maintain a state of colloidal dispersion.

Electrical precipitation, such as the Cottrell process, found effective in the separation of many colloidal particles from gaseous suspension in various industries, was found to be ineffective in separating furnace carbons, for even the flocculated or so-called precipitated black, resulting from the action of the electrical precipitator, was found to be carried along by the gases passing through the unit, and over 75% of the black was lost in the effluent gases.

Painstaking investigation has indicated that, under favorable operating conditions, not more than 2% or 3% by weight of the colloidal particles carried off in the effluent gases from the electrical precipitator have escaped so-called precipitation. Microscopic examination indicates that an extremely high percentage of the carbon black carried off in the effluent gases from the electrical precipitator are present as agglomerates or clusters of particles ranging from 5 microns to well over 1000 microns for the individual groups, with an average of about 30 microns. The efficient recovery of these agglomerates has presented a difficult and troublesome problem.

The value of the carbon black product and the necessity of abatement of nuisance, due to the dissemination of carbon black in the atmosphere in the vicinity of the plant, are important considerations in the recovery of carbon black and require a high degree of recovery. In accordance with the present invention, recoveries of 98% and 99% or better may be effected economically, even in large commmercial sized operations.

The invention relates more particularly to an improved method of separating and collecting such flocculated aerosols involving the use of centrifugal forces such as employed in cyclone separators, but is a radical departure from cyclone separation methods heretofore employed.

Briefly, according to the present invention, the gaseous suspension of the agglomerates, such as results from the action of an electrical precipitator on furnace carbons, is passed at relatively low velocity through cyclone separators of relatively small diameter and of specified relative dimensions, as hereinafter more fully described. The velocity of the gases entering the separator and the diameter of the separator and the relative proportions of the various elements thereof have been found essential to the effective separation of these agglomerates.

As generally understood and practiced, the efficiency of cyclone separators increases with increased velocity and pressure drop, and with decreasing diameters of the separator. The present invention is predicated upon the discovery that flocculent suspensions of furnace carbons, or of similar agglomerates, do not follow the generally recognized and accepted principles of cyclone separation. In the case of such flocculent suspensions, the use of conventional high velocities has been found to result in severe loss in efficiency but that materially improved recovery efficiency may be attained by operating at the low velocities herein described, providing the dimensions and relative proportions of the separator are kept within the herein prescribed limits. In spite of the deviation from recognized principle with respect to velocities, it has been found, oddly enough, that efficient separation of these agglomerates at low velocity, as previously noted, is still promoted by reduction in diameter of the separator but is unfavorably influenced by an increase in the pressure drop. Thus, the use of a plurality of small diameter units, operating in parallel at low velocities and low pressure differentials, has been found to result in unusually effective separation of such flocculent suspensions. It has been found that for maximum recovery at minimum cost the diameter of the individual cyclone units should not exceed about 3 feet. Diameters of about 1 foot to 3 feet may be used with particular advantage, but diameters of 1 to 2 feet are generally preferable.

It is recognized that the use of multiple cyclone separators connected in parallel has previously been proposed for special purposes. However, the type of apparatus previously proposed and the operating conditions resulting from its use were not adapted to the efficient separation of agglomerates of the nature of furnace carbons.

The improved process of the present invention will be further described and illustrated with reference to the accompanying drawings, which represent apparatus in which the process of the invention may, with advantage, be carried out.

Fig. 1 of the drawings is a vertical sectional view of a multiple cyclone separator found to be particularly adapted to the carrying out of the process and comprising nine independent cyclone units connected in parallel.

Figs. 2, 3 and 4 are horizontal sectional views along the lines 2—2, 3—3 and 4—4, respectively;

Fig. 5 is a vertical sectional view of a single cyclone unit of the type shown in Fig. 1;

Figure 6:
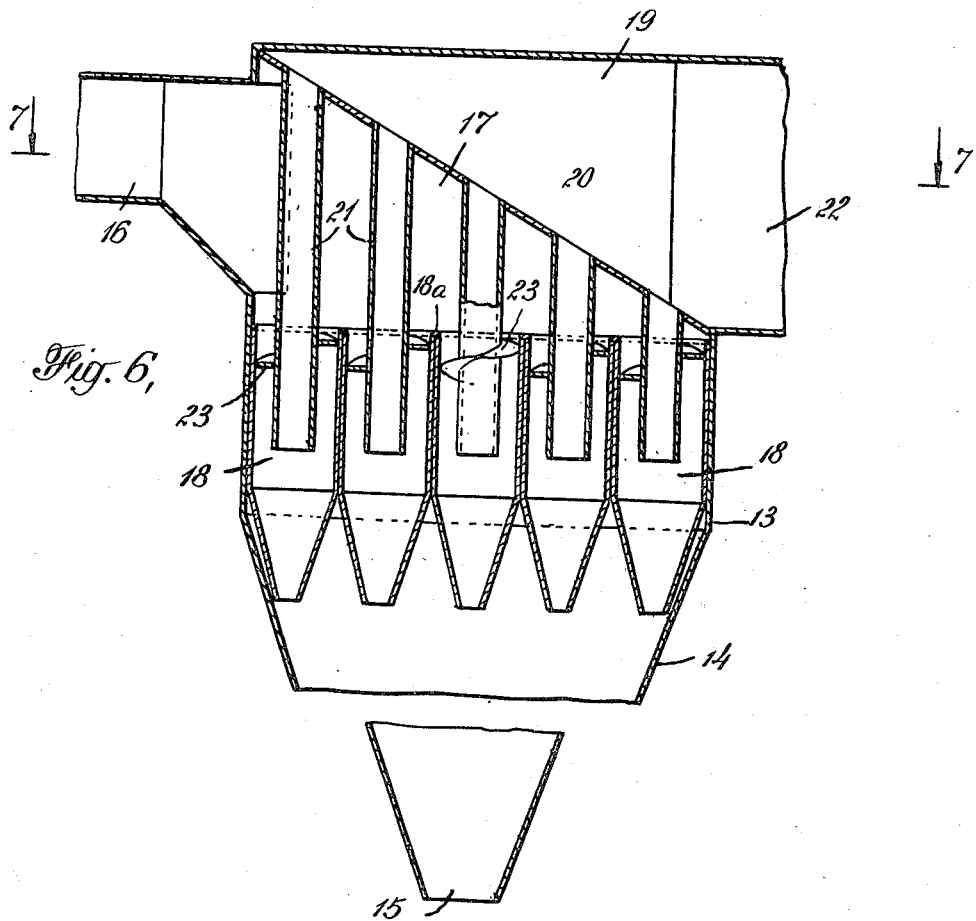
Fig. 6 is a vertical sectional view of a modified form of apparatus.

The apparatus shown in Fig. 1 comprises a rectangular metal housing 1, provided with a cone-shaped lower portion 2, extending downwardly to the discharge outlet 3, which is provided with a conventional air-lock, not shown. Suspended within the housing 1 are nine cyclone separator units 4, each provided with a tangential inlet 5 connected by individual ducts 6 to the main duct 7, which leads from the source of the suspension to be separated, for instance a conventional form of electrical precipitator, not shown. The ducts 6 enter the respective units tangentially at the top of the cylindrical body of the unit, as more fully shown in Fig. 5 of the drawing. The individual units are arranged in rows of 3 units each, the upper end of the cylindrical body of each unit of the row being positioned at different heights, as shown, so as to provide space for the ducts 6 to pass over the forward units to the rearward units.

The upper portion of the rectangular housing 1 is partitioned by plate 7 to form an upper manifold chamber 8 into which the effluent gases from the respective units pass and from thence pass from the apparatus through effluent duct 9 to a secondary unit of similar design.

Co-axially suspended within the respective units 4 are outlet tubes 10, extending downwardly through the plate 7 into the cylindrical body of the unit 4 to a point well below the tangential inlet to the unit. The upper end of the respective units 4 is sealed by cover plate 11 through which the outlet tube 10 passes and to which it is fastened as by welding. The tubes 10 may also be welded to plate 7.

Projecting downwardly from the cylindrical body portion of the unit 4 is a conical portion terminating in the solid-discharge outlet 12.

Figure 7:
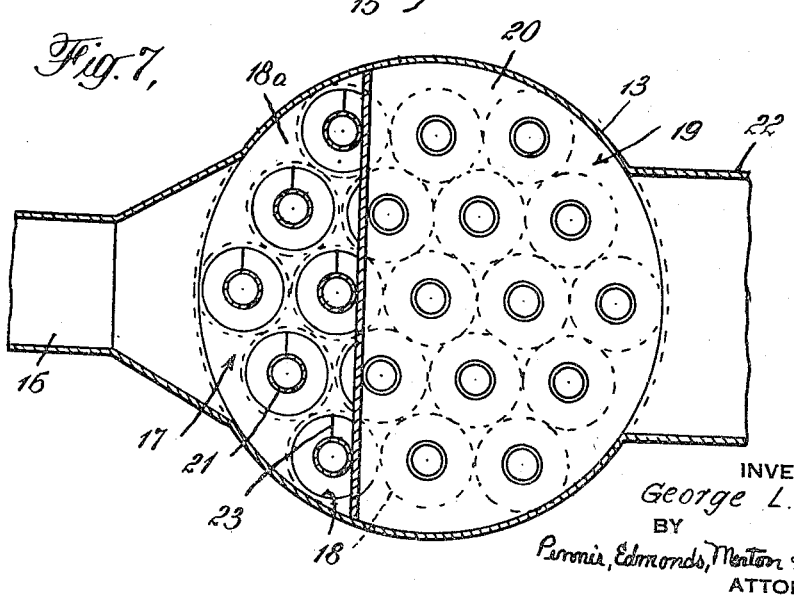
Fig. 7 is a horizontal sectional view of Fig. 6, along the line 7—7.

In the modified arrangement of the apparatus shown in Figs. 6 and 7, a plurality of parallel-connected cyclone separator units 18, are suspended in a cylindrical housing 13, having a lower cone-shaped collecting portion 14 tapering off to the discharge outlet 15, provided with a conventional air-lock, not shown. In this modified arrangement of the apparatus, the suspension to be separated is passed to the apparatus through duct 16 to the manifold chamber 17, which is an open communication with the upper ends of the individual separation units 18. Surmounting the manifold chamber 17 is the manifold chamber 19 separated from chamber 17 by the inclined plate 20. Outlet tubes 21 are suspended from plate 20, to which they are fastened as by welding or beading, and extend downwardly for a substantial distance into the cylindrical body of tre respective units 18, and are co-axially positioned with respect to the respective separating units. The outlet tubes 21 are open at the top and bottom and form a connection between the lower portion of the cylindrical body portion of the unit 18 and the manifold chamber 19, through which the gases from the separation units pass to chamber 19, and from thence pass from the apparatus through conduit 22 to a secondary unit of similar design. The units 18 are suspended from the web plate 18a which is provided with openings of a diameter equal to the inside diameter of the units 18 and beneath which the respective units 18 are fastened, as by welding.

In this modification of the invention, the suspension enters the respective units from the top, instead of tangentially, as in the previously described apparatus. As the suspension enters the respective units, it is given a whirling motion by means of a spiral 23, positioned in the annular entrance to the respective units 18, as more clearly shown in Fig. 6 of the drawings. Even distribution of the incoming suspension is attained by reason of the decreasing cross-sectional area of the chamber 17, due to the inclination of the partition 20.

The spiral 23 advantageously extends completely across the annular entrance to the respective units 18, and may be suspended therein by welding to the walls of the outlet tubes 21 or to the inner walls of the respective units 18, or both. The spiral makes 1¼ turns and no other obstructions, such as baffles or vanes, are provided.

As previously noted the size and relative proportions of the respective units and also the velocity of the suspension entering the respective units are of vital importance. The diameter of the cylindrical body proportion of the respective units should not usually exceed 3 feet. Other important factors are the relative size of the entrance to the respective units, the relative diameter of the exit tubes, each with respect to the diameter of the unit, the distance to which the exit tube extends into the body of the unit below the entrance to the unit, and the length and angle of inclination of the conical, lower portion of the unit. Each of these factors is of importance if maximum separating efficiency of the suspended agglomerates is to be effected.

More particularly, the outlet tube should extend sufficiently below the inlet to require that the incoming suspension makes several complete spirals before any gas thereof can reach the entrance to the exit tube. The transverse sectional area of the inlet to the individual unit should be about ⅛ of the square of the diameter of the cylindrical body portion of the unit. The inlet may be round or rectangular. For instance where the tangential type of entry, such as shown in Figs. 1 to 5 of the drawings, is employed, it has been found particularly desirable to use an inlet of rectangular cross section, the vertical dimension of which is ½ the diameter of the unit and the horizontal dimension about ¼ the diameter of the unit. In an apparatus of the type shown in Figs. 6 and 7 of the drawings, the pitch of the spiral should be about ½ the diameter of the cylindrical body of the unit, where the outside diameter of the outlet tube is half the inside diameter of the cylindrical body of the unit. In general, the pitch of the spiral should equal $$\frac{d^2}{8} \text{ divided by } \frac{d-d_1}{2}$$

where $d$ is the inside diameter of the cylindrical body of the unit and $d_1$ is the outside diameter of the outlet tube.

The height of the cylindrical body portion of the unit should be at least 1½ and, advantageously, twice its diameter. The outlet tube should extend downwardly into the cylindrical body portion of the unit, co-axially with said body portion, to a distance about 1 to 1½ times the diameter of the body portion, but, generally, should terminate at a point not less than about ½ the diameter of the unit from the lower end of the cylindrical body portion. The diameter of the outlet tube should not exceed ½ the diameter of the cylindrical body portion of the unit.

The inclination of the walls of the conical lower portion of the unit, is, with advantage, about 20° from the axis of the cylindrical body portion of the unit. The length of the conical portion of the unit is with advantage about 1½ to two times the diameter of the unit, terminating in a discharge outlet advantageously of a diameter about ¼ of the diameter of the main body of the unit.

To avoid the possibility of accumulation of carbon black in the conical hopper portion of the unit, as is sometimes experienced, particularly where the carbon black is high in extractable hydrocarbons, scrapers may be provided which conform generally with the conical hopper walls, as is well understood in the art. Where such scrapers are used they should be operated at a speed below that at which the separated carbon black is agitated sufficiently to cause re-entrainment, and should not extend into the gas stream more than necessary for strength to resist strain.

The velocity of the suspension entering the individual separating units is advantageously within the range of about 10 feet per second to about 20 feet per second. Velocities in excess of about 20 feet per second result in a progressive decrease in recovery efficiency. Velocities as high as 30 feet per second are permissible, but at velocities higher than 30 feet per second separating efficiency is so low as to be commercially impractical, apparently due to redispersion of the separated agglomerates in the effluent gases. At velocities below about 10 feet per second, operating difficulties are experienced.

In the operation of fluocculent furnace carbon black, in accordance with the present invention, it is desirable to maintain the temperature of the gas stream above 400° F. The surface temperature should be maintained well above the dew point of any constituents of the gaseous mixture and preferably about 100° F. or more above such dew point, in order to avoid condensation and deposits of moisture which might cause "build-ups" of the product in the apparatus, corrosion of the equipment and loss of efficiency.

The advantages of the process of the present invention will be specifically illustrated, as carried out in an apparatus of the type shown in Figs. 1 to 5 of the drawings, comprising nine cyclone units. The cylindrical body portion of each unit was 1 foot 10 inches outside diameter and 1 foot 9¾ inches inside diameter. The outlet tube was a standard 10 inch tube (10 inches inside diameter). The height of the cylindrical body portion was 3 feet 8 inches, the tangential inlet for the gaseous suspension was rectangular, 11 inches high and 5½ inches wide, and the outlet tube projected 2 feet 9 inches into the cylindrical body of the unit. The height of the conical portion was equal to that of the cylindrical body of the unit, and terminated in a discharge opening 5 inches in diameter.

In this operation, the furnace gases from a carbon black generating furnace, containing in suspension approximately 27 grains of carbon black per cubic foot of gas, calculated for dry gas at 60° F. and 30 inches of mercury, were passed through an electrical precipitator. The effluent gases from the precipitator, containing about 22 grains of suspended carbon, per cubic foot on the same basis, were passed through the above described apparatus, the entrance to the individual cyclone units being at a velocity of 10 to 12 feet per second. The temperature of the entering gas was 480° F. and that of the effluent gas was 450° F. The recovery efficiency attained in this operation was in excess of 99%, the concentration of carbon black in the effluent gases being about .10 grain per cubic foot, on the above noted basis.

In a similar operation carried on in this apparatus, in which operating conditions were substantially identical with those just described except that the entrance velocity was 36 feet per second, a recovery efficiency of 89% was attained.

Operations carried out in apparatus of the type disclosed in Figs. 5 and 6 of the drawings of approximately the size and proportion just described, have closely approximated the recovery efficiency of the foregoing illustrations when comparable inlet velocities and other operating conditions were employed.

Though the process is useful in the separation of various flocculent agglomerates from gaseous media, it is particularly effective in the recovery of flocculated furnace carbon blacks from suspensions thereof in furnace gases.

As in conventional operation, the flocculent suspension is passed from the source of supply, to the apparatus of Fig. 1 for instance, through duct 7, through the individual duct 6, through tangential entrance port 5 into the cylindrical body portion of the respective cyclone units. The cyclone action thus effected causes a separation of the flocculent aggregates from the gaseous media, the solid particles falling into the conical hopper portion of the unit and the gaseous component passing up through the outlet tube 10 and out through chamber 8 and conduct 9 to a suitable place of disposition. The solid particles fall through the solid-outlet openings 12 into the collecting hopper 2 from which it may be drawn off from time to time through the air-locked opening 3. The pressure drop through the apparatus is relatively low and velocities and air-currents therethrough are such as to avoid any substantial re-entrainment of the flocculent solids by the effluent gases.

I claim:

In the centrifugal separation of flocculent agglomerates of furnace carbon black from suspension thereof in furnace gases, the improvement which comprises passing the suspension through a plurality of cyclone separators connected in parallel, the respective cyclone separators comprising a cylindrical body portion not exceeding about 3 feet in diameter and of a height equal to about 1½ to 2 times its diameter, an outlet tube co-axially positioned in said body portion and extending downwardly into the body portion for a distance of about 1 to 1½ times the diameter of said body portion, the diameter of said outlet being about ½ that of said body portion, and a cone-shaped hopper member extending downwardly from the cylindrical body portion for a distance approximating the height of said body portion, passing the suspension to the respective cyclone separators through a tangentially arranged inlet port, located at the upper end of said body portion, having an area of about ⅛ the square of the diameter of said body portion of the separator and at a velocity of about 10 to 12 feet per second.

GEORGE L. HELLER.

REFERENCES CITED

The following references are of record in the file of this patent:

UNITED STATES PATENTS

| Number | Name | Date |
| --- | --- | --- |
| 441,140 | Culver et al. | Nov. 25, 1890 |
| 1,393,553 | Leonhardt | Oct. 11, 1921 |
| 1,973,764 | Horne et al. | Sept. 18, 1934 |
| 1,997,125 | Soyez et al. | Apr. 9, 1935 |
| 2,153,026 | Ringuis | Apr. 4, 1939 |

FOREIGN PATENTS

| Number | Country | Date |
| --- | --- | --- |
| 23,549 | Austria | May 9, 1935 |
| 42,080 | Holland | Nov. 15, 1937 |
| 390,053 | Great Britain | Mar. 30, 1933 |